UNITED STATES PATENT OFFICE.

GEORGES ALBERT MORTIER, OF FULWOOD, PRESTON, ENGLAND.

TIRE FOR VEHICLES.

1,247,988.  Specification of Letters Patent.  Patented Nov. 27, 1917.

Application filed June 19, 1917. Serial No. 175,612.

*To all whom it may concern:*

Be it known that I, GEORGES ALBERT MORTIER, a subject of the King of Belgium, residing at 5 Hall road, Fulwood, Preston, in the county of Lancaster, England, have invented certain new and useful Improvements in Tires for Vehicles, of which the following is a specification.

This invention relates to resilient tires for vehicle wheels, said tires being provided with floating rings which distribute the strain between the upper and lower portions of the tire; and it consists in the novel construction and combination of the parts hereinafter fully described and claimed.

Figures 1, 2:
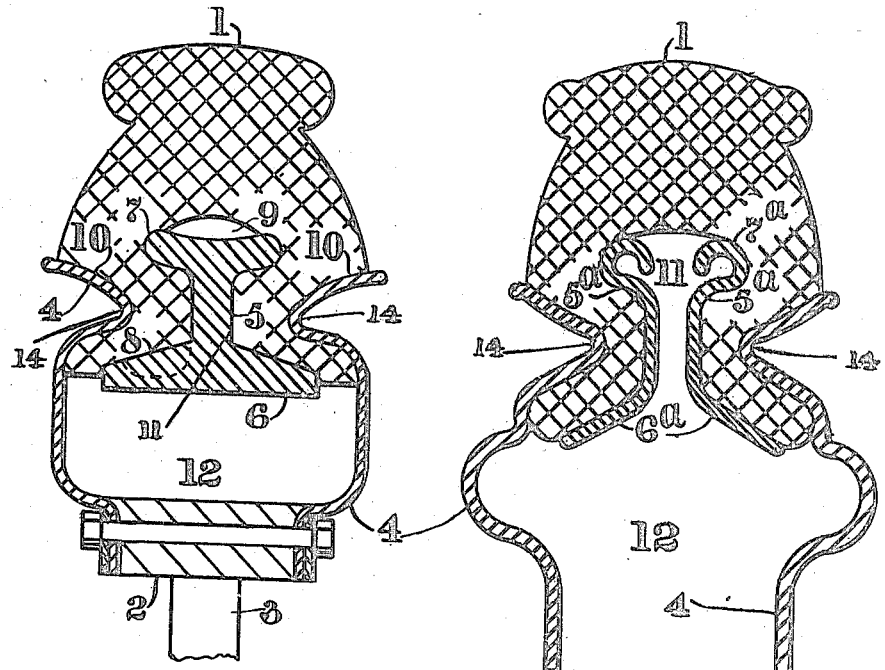
Figure 3:
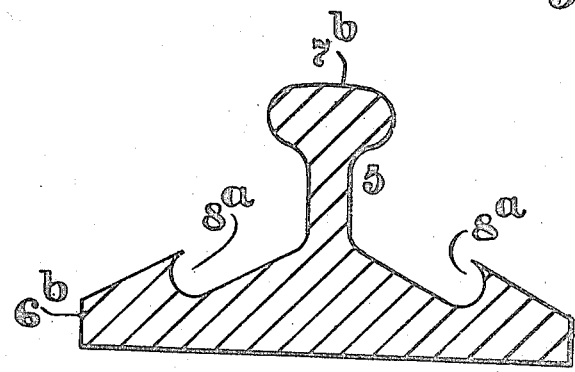

In the drawings, Figure 1 is a cross-section through a wheel rim provided with a tire according to this invention. Fig. 2 is a similar cross-section, showing a modification. Fig. 3 is a cross-section through a modified form of floating ring.

The felly 2 of the wheel is carried by spokes 3, and it has side plates 4 secured to it. These side plates 4 have circumferential projections 14 which are preferably V-shaped, and which are arranged to project inwardly at the outer parts of the plates with their apices opposite to each other.

The tire has a tread 1 and it is formed of india rubber or other similar elastic material, and it has grooves in its sides which engage with the projections 14. The tire has also a central circumferential groove 11 which extends from its underside upwardly between its side grooves for about one-half of its height.

The floating ring is arranged in the groove 11, and it is preferably something like a railroad rail in cross-section, having a web 5, a base flange 6, and an upper flange 7. The top of the upper flange is preferably concave, and a circumferential channel or air-space 9 is formed in the tire above it.

A series of similar recesses or air-pockets 8 may also be formed in the upper side of the lower flange 6 on each side of the central web 5.

The pressure of the tread against the ground on the lower side of the wheel, forces the floating ring upwardly in the elastic tire, so that the strain upon the elastic tire is distributed, and is not confined to that portion of it nearest the ground.

In the modification shown in Fig. 2, the floating ring is formed of two sections having an air space between their web portions $5^a$, which air space communicates with the space 12 between the side plates 4. The flange portions $6^a$ and $7^a$ project laterally of the web portions, and they straddle the projections 14 in a similar manner to the flanges 6 and 7 as shown in Fig. 1. The sections or halves of the floating ring shown in Fig. 2 are operatively connected together by the elastic material of the tread, but they may be connected together in any other approved manner, as it is not necessary for the air space between their webs to be continuous.

In the modification shown in Fig. 3, the top flange $7^b$ is much smaller than the bottom flange $6^b$, and the bottom flange has continuous air-grooves $8^a$ instead of pockets 8. The compression of the air in the pockets and grooves adds to the resiliency of the tire.

What I claim is:

1. The combination, with the side plates having circumferential projections which project inwardly, of a solid tire of elastic material having circumferential grooves which engage with the said projections, said tire having also a central circumferential groove extending outwardly from its underside, and a floating ring arranged in the said central groove in contact with the sides thereof and provided with upper and lower flanges which straddle the said projections.

2. The combination, with the side plates having circumferential projections which project inwardly, of a solid tire of elastic material having circumferential grooves which engage with the said projections, said tire having also a central circumferential groove extending outwardly from its underside, and a floating ring arranged in the said central groove in contact with the sides thereof and provided with upper and lower flanges which straddle the said projections, the lower flange of the said floating ring being provided with air chambers which are closed by contact with the adjacent surfaces of the tire.

3. The combination, with the side plates having circumferential projections which project inwardly, of a solid tire of elastic material having circumferential grooves which engage with the said projections, said tire having also a central circumferential groove extending outwardly from its underside, and a floating ring formed in two sections operatively connected together and arranged side by side in the said groove in contact with the sides thereof, and with an air space between them and provided with upper and lower flanges which straddle the said projections.

4. The combination, with a solid tire of elastic material having a central circumferential groove which extends outwardly from its underside, of a floating ring arranged in said groove, said ring being substantially rail-shaped in cross-section and having a lower flange which is broader than its top flange, and having its bottom flange arranged with its upper surface in contact with the underside of the tire, and fastening devices which secure the lower side portions of the tire against the web and upper flange of the said ring.

In testimony whereof I affix my signature in the presence of two witnesses.

GEORGES ALBERT MORTIER.

Witnesses:
GEORGE AMBLER,
W. C. TIPPING.

Copies of this patent may be obtained for five cents each, by addressing the "Commissioner of Patents, Washington, D. C."